United States Patent [19]

Bedford et al.

[11] Patent Number: 5,103,800
[45] Date of Patent: Apr. 14, 1992

[54] NOZZLE FOR STEAM COOKING DEVICE

[75] Inventors: James P. Bedford, Willoughby; John Jevnikar, Mentor, both of Ohio

[73] Assignee: Cleveland Range, Inc., Cleveland, Ohio

[21] Appl. No.: 698,799

[22] Filed: May 13, 1991

[51] Int. Cl.⁵ .............................................. A21B 1/08
[52] U.S. Cl. .................................. 126/20; 126/348; 126/369; 219/401; 239/521
[58] Field of Search ..................... 126/20, 20.1, 20.2, 126/21 R, 369, 369.1–369.3, 348, 377, 378; 99/467, 330; 219/401; 392/401; 239/521, 523, 282; 137/592; 251/127

[56] References Cited

U.S. PATENT DOCUMENTS

| | | | |
|---|---|---|---|
| 3,071,063 | 1/1963 | Churley | 126/20 |
| 3,639,725 | 2/1972 | Maniscalco | 126/20 |
| 4,281,636 | 8/1981 | Vegh et al. | 126/20 |
| 4,460,822 | 7/1984 | Alden | 126/369 |
| 4,582,047 | 4/1986 | Williams | 126/20 |

FOREIGN PATENT DOCUMENTS

| | | | |
|---|---|---|---|
| 176189 | 3/1953 | Fed. Rep. of Germany | 126/20 |
| 16907 | of 1892 | United Kingdom | 126/369 |

*Primary Examiner*—James C. Yeung
*Attorney, Agent, or Firm*—Porter, Wright, Morris & Arthur

[57] ABSTRACT

A nozzle for use in a steam cooking device having a cooking chamber wherein the nozzle is positioned in a side wall of the cooking chamber, the nozzle comprising a body portion having therein an aperture and having first and second disks positioned on each side of the aperture and wherein steam enters the cooking chamber through the aperture.

9 Claims, 4 Drawing Sheets

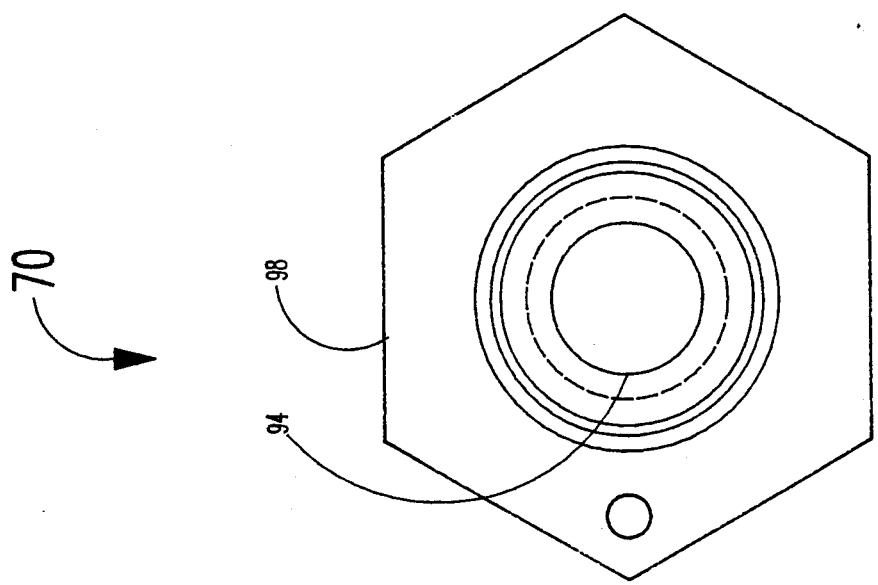
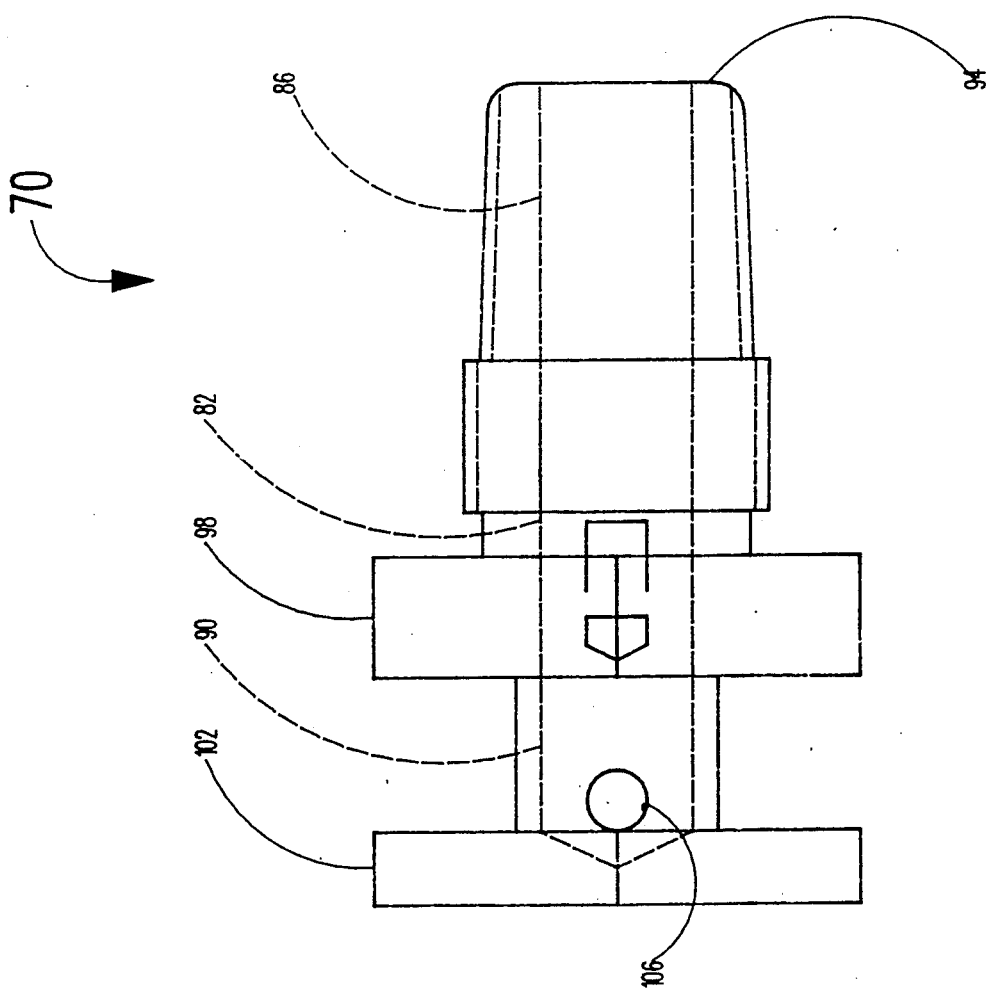

NOZZLE FOR STEAM COOKING DEVICE

BACKGROUND OF THE INVENTION

This invention relates to steam cooking devices, and particularly to arrangements for introducing steam into the cooking chamber of steam cooking devices.

The advantages of steaming certain foods rather than cooking these foods by other methods have become well-recognized in recent years. For example, when meats are cooked under dry conditions, as when baked, the meat looses its intrinsic moisture and may become dried out and unpalatable. Further, vegetables contain certain valuable minerals which are retained if the vegetables are steamed rather than cooked by other means, such as boiling.

Current steam cooking devices utilize steam generated in a boiler to cook or thaw food. This steam is transported from the boiler to a cooking chamber where it is introduced into the cooking chamber by a conduit or the like extending from the boiler to an opening in the wall of the cooking chamber. Although this method of introducing steam into the cooking chamber sometimes provides acceptable steam distribution within this cooking chamber, it is difficult to control the direction of the steam and the circulation of the steam within the cooking chamber. The steam distribution inside the cooking chamber tends not to be uniform. Accordingly, there is a need for a method of introducing steam into the cooking chamber of a steam cooking device which will increase the steam circulation and the uniformity of the steam distribution within the cooking chamber and thereby improve the cooking performance of the steam cooking device.

SUMMARY OF THE INVENTION

The invention provides a steam cooking device comprising a steam generating chamber having a steam generator, a cooking chamber adjacent to the steam generating chamber for receiving steam from the steam generator, the cooking chamber including top and bottom walls, a rear wall and opposite side walls and nozzle means in one of the walls for introducing steam into the cooking chamber, the nozzle means including a body portion having thereon first and second plates and an aperture positioned between said plates wherein steam is injected into the cooking chamber through the aperture.

The invention also provides a nozzle for use in a steam cooking device having a cooking chamber wherein the nozzle is positioned in a side wall of the cooking chamber, the nozzle comprising a body portion having therein an aperture and having first and second disks positioned on each side of the aperture and wherein steam enters the cooking chamber through the aperture.

The invention also provides a method for introducing steam into the cooking chamber of a steam cooking device comprising the steps of generating steam in a steam generating chamber, transporting the steam from the steam generating chamber to the cooking chamber and introducing the steam into the cooking chamber through a nozzle, wherein the nozzle includes a body portion extending inwardly from and perpendicular to a side wall in the cooking chamber, wherein the body portion includes first and second disks and an aperture position between the disks and wherein the aperture is positioned to inject steam into the cooking chamber parallel to the side wall of the cooking chamber.

A principal feature of the invention is a nozzle for use in a steam cooking device. The nozzle provides improved control of steam direction and improved uniformity of steam distribution in the cooking chamber of a steam cooking device. This improved steam control and distribution will provide improved cooking performance and cooking time. The nozzle also allows steam to be injected into the cooking chamber of a steam cooking device at a higher velocity. This will also give improved cooking performance and cooking time.

Other principal features and advantages of the invention will become apparent to those skilled in the art upon review of the following detailed description, claims and drawings.

BRIEF DESCRIPTION OF THE DRAWINGS

FIG. 3 is a side elevational view of the nozzle of the present invention;

FIG. 4 is an end view of the nozzle shown in FIG. 4;

Figure 1:
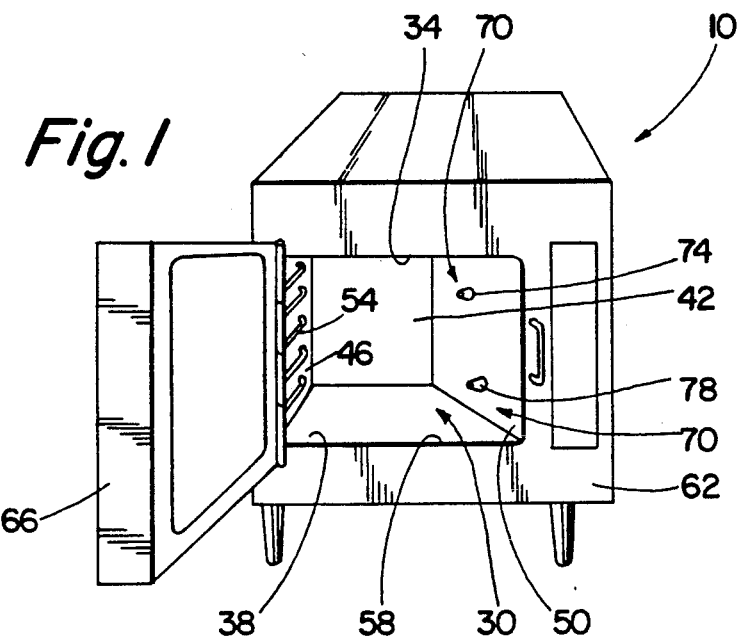
FIG. 1 is a front perspective view of a steam cooking device embodying the invention.
Figure 2:
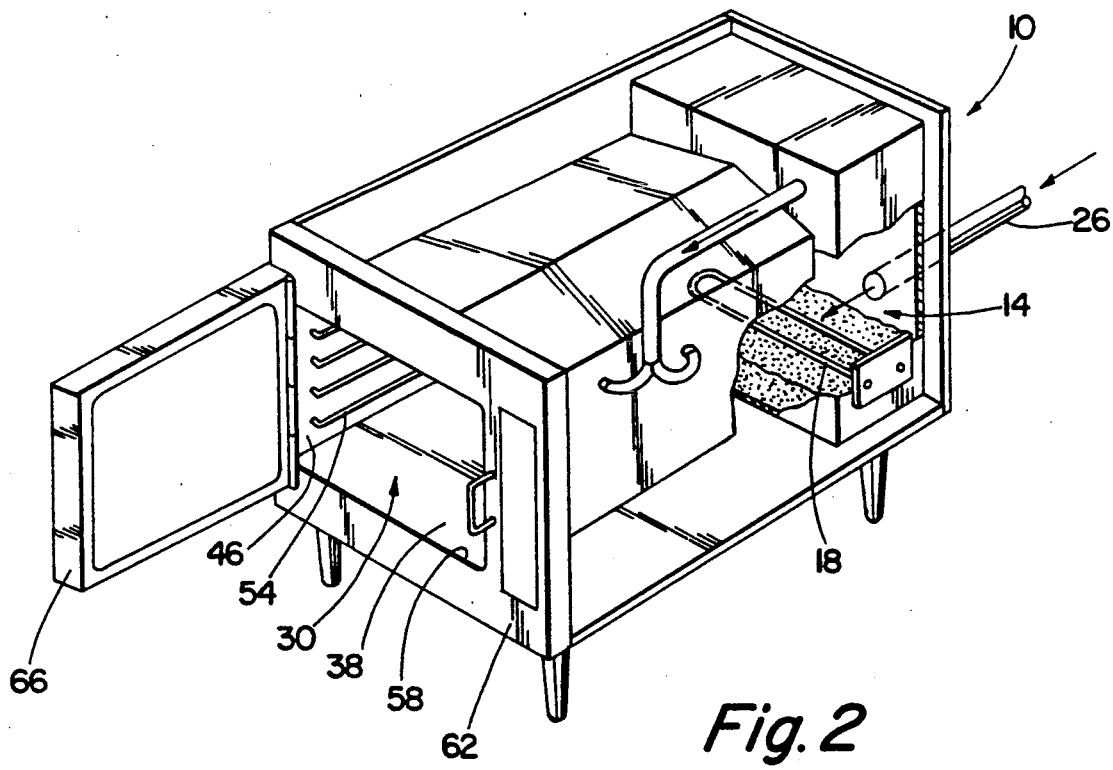
FIG. 2 is a side elevational view, partially broken away of a steam cooking device embodying the invention.

Before one embodiment of the invention is explained in detail, it is to be understood that the invention is not limited in its application to the details of construction and the arrangement of components set forth in the following description or illustrated in the drawing. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT(S)

A steam cooking device 10 embodying the invention is illustrated in the drawings.

Before the invention is explained in detail, it should be understood that the nozzle of the present invention can be used with almost any conventional steam cooking device which injects steam into a cooking chamber, the operation of which is well-known in the art. An example of a suitable steam cooking device is the Steamcraft ® 3.1 Counter Type Convection Steamer manufactured by Cleveland Range, Inc. in Cleveland, Ohio.

The steam cooking device 10 includes a steam generating chamber 14 containing a heating element 18. The heating element 18 is positioned in the steam generating chamber 14 to heat water 22 which is introduced into the steam generating chamber 14 via conduit 26. After water 22 has been introduced into the steam generating chamber 14, the heating element 18 is activated to heat water 22 to 212° F. to produce steam. The steam rises to the top of the steam generating chamber 14 where it is transported to the cooking chamber 30 of the steam cooking device 10.

The cooking chamber 30 is adjacent to the steam generating chamber 14 and includes a top wall 34, a bottom wall 38, a rear wall 42 and opposite side walls 46 and 50. The cooking chamber 30 further includes tray slots 54 for receiving trays which can support food in the cooking chamber 30. These tray slots 54 are preferably positioned on one of the side walls 46 and 50. It should be noted that food may be placed on the bottom wall 38 in the cooking chamber 30 as well as on trays placed in the tray slots 54.

The cooking chamber 30 has an opening 58 opposite rear wall 42 to provide access to the interior of the cooking chamber 30. The opening 58 is surrounded by a rectangular face 62 and a door 66 is hinged to this face on one side of the opening 58. The door 66 is closed when steam is injected into the cooking chamber 30 in order to contain the steam within the cooking chamber 30.

The cooking chamber 30 further includes nozzle means 70 for introducing steam into the cooking chamber 30. Although the nozzle means 70 may be positioned in any of the walls 34, 38, 42, 46 and 50, the nozzles are preferably positioned in one of the side walls 46 and 50 opposite the tray slots 54. The nozzle means 70 may also be positioned in more than one of the walls 34, 38, 42, 46 and 50. For example, the nozzle means may be placed in both side walls 46 and 50 or in the rear wall 42 and one of the side walls 46 and 50. The nozzle means 70 may be threadably inserted into one of the side walls 46 and 50 or inserted by other various suitable means. The nozzle means 70 is preferably machined as one piece, but may be fabricated by other means including welding or brazing. Further, although the nozzle means 70 is illustrated in FIG. 1 as comprising two nozzles 74 and 78, any number of nozzles can be utilized to introduce steam into cooking chamber 30 and these nozzles can be positioned in any of the walls 34, 38, 42, 46 and 50 or in more than one of the walls 34, 38, 42, 46 and 50. The nozzle means 70 (see FIG. 4) is comprised of a body portion 82 having first and second ends 86 and 90. The first end 86 is inserted into the side wall 50 of the cooking chamber 30 and the first end 86 has therein an aperture 94 to receive the steam from the steam generating chamber 14. The body portion 82 further has first and second disks or plates 98 and 102 positioned near the second end 90 of the body portion 82. The disks or plates 98 and 102 encircle the body portion 82 and may be of any shape, although they are preferably round or hexagonal in shape.

An aperture 106 is positioned between the disks or plates 98 and 102 in the body portion 82 of the nozzle means 70 and the steam enters the cooking chamber 30 through the aperture 106. The body portion 82 of the nozzle means 70 extends inwardly from and perpendicular to the side wall 50 of the cooking chamber 30 and the aperture 106 is positioned such that the steam will exit the aperture 106 and enter the cooking chamber 30 parallel to the side wall 50. The disks or plates 98 and 102 help to keep the nozzle from turning when steam is injected into the cooking chamber 30 at a high velocity.

Prior methods for introducing steam into the cooking chamber of a steam cooking device include drilling small holes in a tube to inject steam into the cooking chamber at several points and injecting steam directly from the steam generating chamber into the cooking chamber by a conduit running from the steam generating chamber into the cooking chamber. These prior methods of introducing steam into the cooking chamber of a steam cooking device provided an acceptable distribution of the steam, but the distribution of the steam was not uniform. For example, the steam was typically introduced into the cooking chamber at an angle perpendicular to the side walls of the cooking chamber. In this fashion, the steam would be distributed throughout the entire chamber, but the steam tended to stop at the first side of the first piece of food it contacted. In this fashion, one side of one piece of food would cook much more quickly than the other side of the food. Likewise, if there was more than one piece of food in the cooking chamber, the first piece of food the steam would contact would tend to cook more quickly than pieces further from the steam.

A further problem with these prior methods for introducing steam into the cooking chamber of a steam cooking device is that when the steam is injected into the cooking chamber at high velocities, the tube or conduit tends to turn and the steam therefore exits the tube or conduit at angle of about 45 degrees and this causes the same problem with steam uniformity as previously discussed.

The nozzle means 70 of the present invention allows steam to be injected into the cooking chamber 30 at higher velocities than previous methods. The nozzle means 70 of the present invention also provides much better control of the steam direction and also provides improved steam distribution and steam uniformity within the cooking chamber 30. This is illustrated by the graphs in FIGS. 5 and 6.

Figure 5:
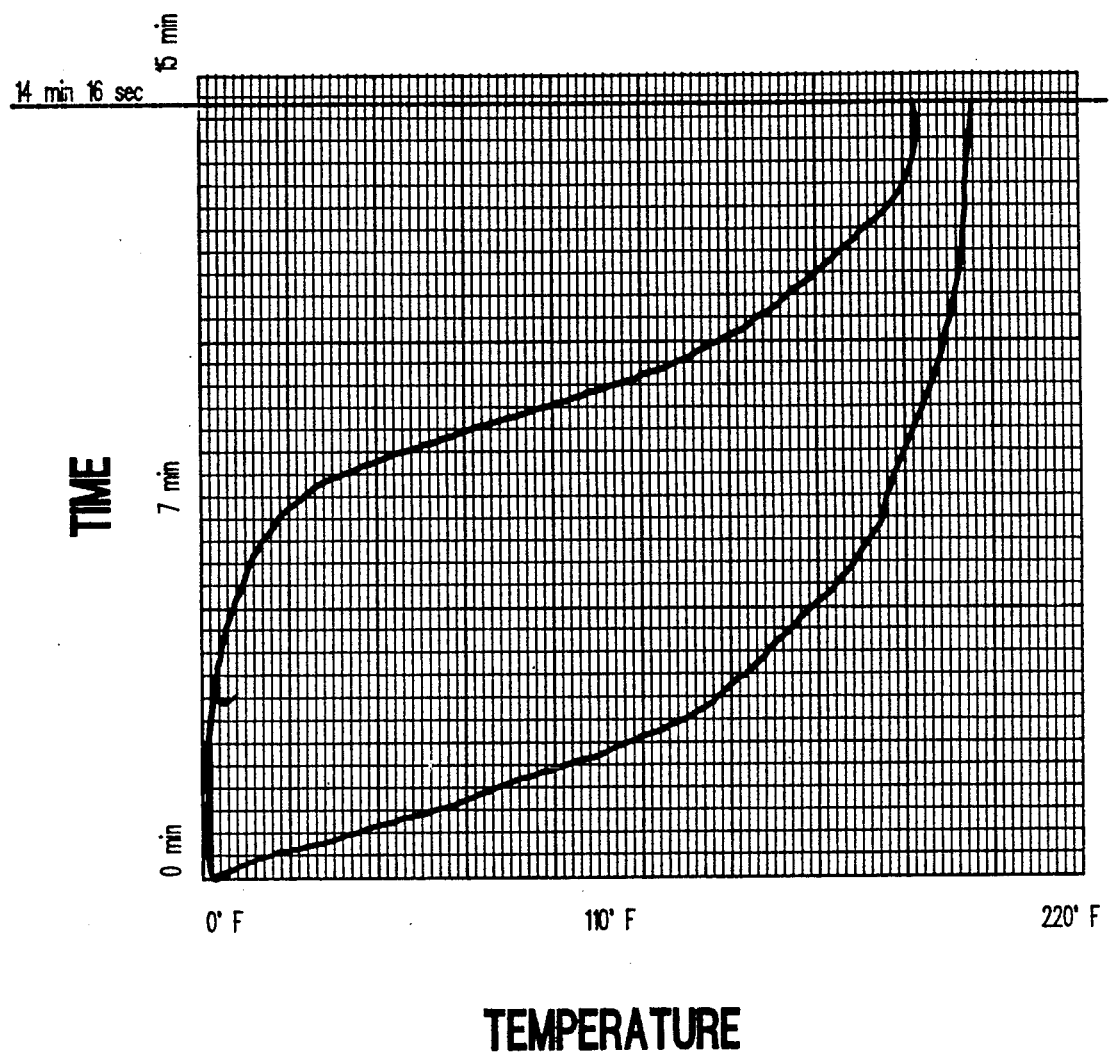
FIG. 5 is a graph illustrating the time for two thermocouples in frozen pieces of rubber placed in the cooking chamber of a steam cooking device to reach 200° F. when steam is injected by an alternate nozzle.
Figure 6:
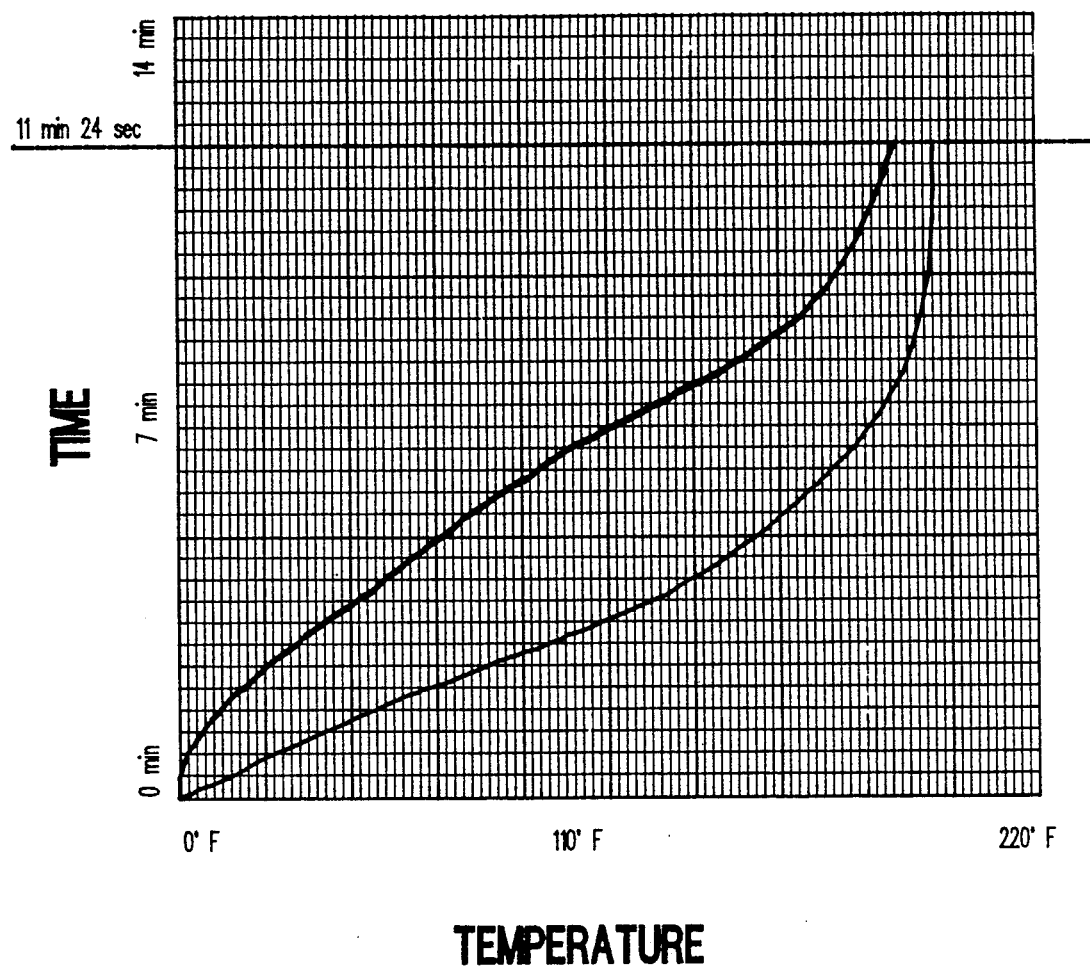
FIG. 6 is a graph illustrating the time for two thermocouples in frozen pieces of rubber placed in the cooking chamber of a steam cooking device to reach 200° F. when steam is injected by the nozzle of the present invention.

In FIGS. 5 and 6, five frozen pieces of rubber were placed on trays which were inserted into five tray slots in the cooking chamber of a Steamcraft 5.1 ® Steamer manufactured by Cleveland Range, Inc. in Cleveland, Ohio. Each piece of rubber contained three thermocouples-one in the rear, one in the middle, and one in the front-to measure the temperature of the rubber at those points. The steamer used in these tests had four nozzles positioned on the side wall in the cooking chamber opposite tray slots.

On the graphs in the FIGS. 5 and 6, the horizontal axis is representative of the temperature of the piece of rubber at the thermocouple in degrees fahrenheit and the vertical axis is representative of time in minutes. The test which was performed consisted of injecting steam into the cooking chamber of the steamer until all the thermocouples registered at least 200° F. In FIG. 5, the steam was injected into the cooking chamber through an alternate nozzle, while in FIG. 6 the steam was injected into the cooking chamber through the nozzle of the present invention. Although fifteen time vs. temperature curves were generated for each test, only the two curves representing the two thermocouples that were the slowest and the fastest to register 200° F. are illustrated in FIGS. 5 and 6. The other thirteen curves fell somewhere between these two curves.

The improvements in cooking time and steam distribution obtained when using the nozzle of the present invention are clear from the graphs. First, the time for all of the thermocouples to register 200° F. (the cooking time) when the steam was injected into the cooking chamber through the nozzles of the present invention was 11 minutes and 24 seconds (see FIG. 6). This is a clear improvement over the cooking time of 14 minutes and 16 seconds which was obtained when steam was injected into the cooking chamber through the alternate nozzle design (see FIG. 5). Further, the uniformity of the steam distribution was improved when the steam was injected into the cooking chamber through the nozzle of the present invention. This is illustrated in FIG. 6 by the "tightness" or closeness of the two curves. The fact that the two curves representing the slowest and fastest thermocouples to reach 200° F. are closer together in FIG. 6 than in FIG. 5 illustrates that the steam distribution in the cooking chamber was more uniform when the steam was injected into the cooking chamber using the nozzle of the present invention (FIG. 6). The large spread between the lower curve and the upper curve in FIG. 5 illustrates that the temperature at the thermocouple represented by the lowest curve was much greater than the temperature of thermocouple represented by the upper curve throughout the time the steam was introduced into the cooking chamber.

Various features of the invention are set forth in the following claims.

What is claimed is:

1. A steam cooking device comprising:
   a steam generating chamber having a steam generator;
   a cooking chamber adjacent to said steam generating chamber for receiving steam from said steam generator, said cooking chamber including top and bottom walls, a rear wall and opposite side walls; and
   nozzle means in one of said walls for introducing steam into said cooking chamber, said nozzle means including a body portion having thereon first and second plates and an aperture positioned between said plates wherein steam is injected into said cooking chamber through said aperture.

2. The cooking device of claim 1 wherein said nozzle means is in one of said side walls.

3. The cooking device of claim 2 wherein said aperture is positioned to inject steam into said cooking chamber parallel to said side walls.

4. The cooking device of claim 1 wherein said nozzle means comprises a plurality of nozzles in one of said side walls.

5. The cooking device of claim 1 wherein said nozzle means comprises a plurality of nozzles in each of said side walls.

6. The cooking device of claim 1 wherein said nozzle means comprises a plurality of nozzles in said rear wall and one of said side walls.

7. A nozzle for use in a steam cooking device having a cooking chamber wherein said nozzle is positioned in a side wall of said cooking chamber, said nozzle comprising a body portion having therein an aperture and having first and second disks positioned in either side of said aperture and wherein steam enters said cooking device through said aperture.

8. The nozzle of claim 7 wherein said body portion extends inwardly from and perpendicular to said side wall and wherein said aperture is positioned such that steam is introduced into said cooking chamber parallel to said side wall.

9. A method for introducing steam into the cooking chamber of a steam cooking device comprising the steps of:
   generating steam in a steam generating chamber;
   transporting the steam from the steam generating chamber to the cooking chamber;
   introducing the steam into the cooking chamber through nozzle means, said nozzle means including a body portion extending inwardly from and into a side wall in the cooking chamber, said body portion including at least one disk secured to said body portion and an aperture positioned in said body portion and in spaced relationship with said at least one disk and said aperture is positioned to inject steam into the cooking chamber parallel to the side wall of the cooking chamber.

* * * * *